Figure 1:
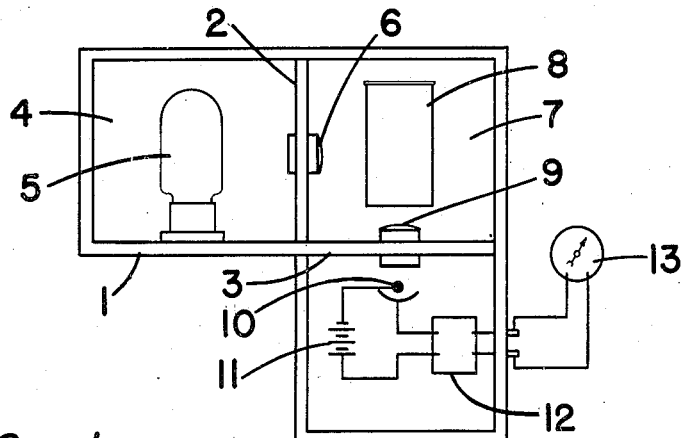

Dec. 21, 1943.                J. J. HEIGL                    2,337,465
                              WELL LOGGING
                           Filed Oct. 26, 1940

John J. Heigl, INVENTOR.
BY P. J. Whelan
   Atty.

Patented Dec. 21, 1943

2,337,465

UNITED STATES PATENT OFFICE 2,337,465

WELL LOGGING

John J. Heigl, Tulsa, Okla., assignor to Standard Oil Development Company, a corporation of Delaware Application October 26, 1940, Serial No. 362,890

1 Claim. (Cl. 250—71)

The present invention is directed to well logging and particularly to that type of well logging which has come to be known as ditch logging.

It has already been proposed to examine the drilling mud returns from an oil well which is being drilled by the rotary method with a circulating mud stream under ultraviolet light to determine the presence in the drilling fluid of crude oil. This examination is usually made by taking samples of the mud, subjecting them to rays of an ultraviolet lamp and observing whether or not there is any fluorescence emitted from the sample. The fluorescence is supposed to indicate the presence of crude oil. This procedure does not permit of any quantitative determination of the amount of oil in the mud, but is a truly qualitative method.

The principal object of the present invention is the provision of a quantitative method for determining the amount of oil in a drilling fluid.

The present invention is based on the discovery that when oil is dissolved in a non-fluorescent solvent the fluorescence of the oil under ultraviolet light is so distributed throughout the body as to make possible a quantitative light measurement of the fluorescence. It has been found that this measurement is made possible only by a very great dilution of the oil in the solvent. For example, in order for the measurement to be made quantitative, the solution should not contain substantially more than one part of oil to one hundred parts of solvent by volume. Better determinations are made when the solution is even more dilute, such as one part of oil in a thousand parts of solvent. Solutions as small as one part of oil in a million parts of solvent give a fluorescence which is readily measurable. Thus, the method is sensitive to at least one part of oil in a million parts of solvent by volume. But this is not the absolute sensitivity of the method, it being quite certain that even more dilute solutions are measurable.

Solvents for crude oil which do not fluoresce are many in number and are well known in the art. Typical solvents of this type are benzol, carbon tetrachloride, ethers, such as ethyl ether, toluene, xylene, and the like. It may be noted here that the solvent must be one which is water immiscible.

In the practice of the method of the present invention in one of its simpler forms a sample of mud is segregated and agitated with a quantity of the solvent. The quantity of the sample used is not particularly important except that an effort should be made to obtain a fairly representative sample of the mud stream. Likewise, there is considerable latitude in the amount of solvent that is to be used on the sample. For purposes of illustration it may be mentioned that a 1000 cc. sample of mud may be treated with about 100 cc. of solvent, this quantity of solvent being usually sufficient to bear a volume ratio of at least 1000:1 to any oil that may be contained in the sample. The solvent, after thorough agitation, is then separated from the rest of the sample and is placed in a tube or cell where it is exposed to ultraviolet light, and the light emitted by fluorescence is measured by any light measuring device, such as a photocell arrangement. It may be pointed out here that it is preferable to have the photocell or light measuring arrangement so located as to receive rays which travel at substantially right angles to the path of the ultraviolet rays from the ultraviolet light source.

In the practice of this invention, in order that results may be comparable, it is desirable to secure a composite sample of the drilling mud. For example, any of the host of known sampling devices may be used which are located in the mud stream and collect a portion of the mud as it passes. For the purpose of making these samples composite the collection may be carried on during any selected increment of penetration of the drill bit or, if desired, during the passage of any selected volume of mud past the sampling device. With the sampling technique standardized the same quantity of mud sample should be used with the same quantity of solvent for each test. It will be understood, of course, that the mud samples will be correlated with the depth of the hole in any one of the usual ways well known in the art. That is to say, it is well known in text books on drilling practice how to determine the depth of the formation from which the cuttings in any sample of mud are derived. This depth determinatoin has been practiced for a great many years for the purposes of identifying cuttings for paleontological purposes.

A simple and convenient method for determining the depth from which the cuttings in a given sample of mud come is described on pages 66 et seq. of Petroleum Production Methods by John R. Suman, 3rd edition, published by the Gulf Publishing Company of Houston, Texas, in 1923. The author gives a formula for calculating the time to wait for cuttings from a given depth to reach the surface for any depth of hole, radius of hole, diameter of drill stem, etc. Most of the factors in the formula remain constant for a given location whereby the determination of the depth from which cuttings are obtained is reduced to the counting of pump strokes and observation of the depth of drilling as indicated on the grief stem or Kelly joint. The author gives charts showing the time to wait for collection of a sample of a desired formation in holes of different radius with drill stems of different diameter.

It will be understood, of course, that this method for correlating cuttings with depth was based on a recognition of the fact that the cuttings from a given formation move with the drilling fluid and retain their position in the drilling fluid in the flow of the latter to the surface, and the author points this out. This recognition of the absence of lineal mixing of drilling fluid during a cycle in rotary drilling is further evidenced by another simple practice which has been followed for years for determining the lag between the drill bit and the arrival of cuttings from the drill bit at the surface. This well known practice consists in adding colored particles to an ingoing stream of mud and observing these particles when they reach the discharge end of the mud cycle. The volume of the drill stem and the pump displacement being known, the time for the colored particles to reach the bottom can be readily ascertained and subtracted from the total time of circulation to leave a figure representing time lag between depth of drill bit and arrival of cuttings at the surface. These colored particles, after their return to the surface, are, of course, thoroughly intermingled in the mud in the settling pit, in which the mud is ordinarily well agitated by the use of mud guns, so that the procedure can be repeated as often as desired, either with particles of the same color or differently colored particles.

Other methods for correlating any selected sample obtained from the mud discharge line with the depth from which the cuttings in the sample are derived could be mentioned, but the above are believed to be fairly representative. They are sufficient, at any rate, to establish that the practice of identifying portions of the mud stream discharged from the bore hole at the surface with depth is as old as the art of rotary drilling itself and forms, per se, no part of the present invention.

In a more elaborate embodiment of the present invention the measurements are made continuously and recording of the results is automatic. In this embodiment a regulated amount of the mud continuously flows through an apparatus which consists of a mixing vessel to which the solvent enters simultaneously with the mud, a settling vessel, a light chamber, and a solvent recovery vessel. In the light chamber is a transparent cell through which the solvent, after separation from the mud, is passed continuously, there being a source of ultraviolet light continuously playing on the transparent cell and a photoelectric cell arranged in position to receive light rays from the transparent cell, and means associated with the photoelectric cell for amplifying the currents generated by the light evolved in the transparent cell and to record such currents on a moving strip of sensitized paper which may be synchronized with the drilling equipment in such a way as to provide for a predetermined film movement for a given amount of penetration of the drill bit.

Figure 2:
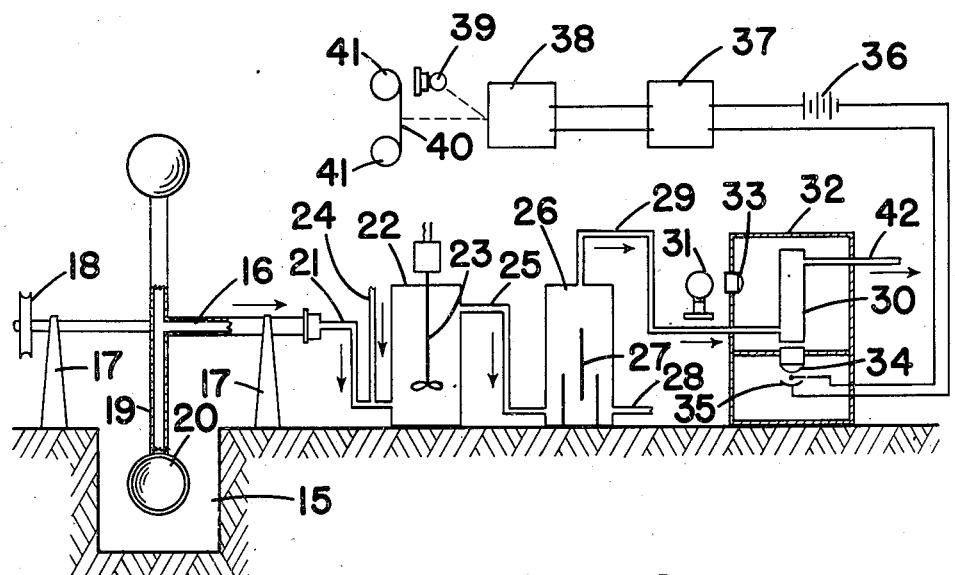

The nature and objects of the present invention will be better understood from the following detailed description of the accompanying drawing in which Fig. 1 is a front elevation with the front removed of an apparatus for carrying out one embodiment of the method of the present invention, and Fig. 2 is a similar view in diagrammatic form of an apparatus suitable for continuous operation in accordance with the method of the present invention.

Referring to the drawing in detail, numeral 1 designates a box divided into three compartments by partitions 2 and 3. In compartment 4 is arranged a bulb 5 which is capable of emitting ultraviolet light. The rays of this light pass through a lens 6 in partition 2. Lens 6 is a filtering lens which passes only ultraviolet light. Arranged in compartment 7 in the path of the rays entering through the lens 6 is a tube 8 which is suitably held by clamps (not shown). This is an ordinary test tube, but is preferably one having a flat bottom. The bottom of the tube is arranged in alignment with a lens 9 in the partition 3, which lens is made of glass which does not pass ultraviolet light. Glass of this type is readily available on the market.

Immediately below the lens 9 is a photocell 10, across the electrodes of which is arranged a suitable battery 11. The output of the photocell is fed to an amplifier 12 of conventional design, the output of which is fed to a meter 13 arranged outside the box 1. The meter 13 is a conventional micro-ammeter and can be any other highly current-sensitive device. In using this apparatus the solvent which has been used to extract the mud sample is placed in the tube 8 and the meter 13 is read.

In the embodiment shown in Fig. 2 the measurement of fluorescence is continuous. In this figure numeral 15 represents a mud ditch over which is mounted a mud sampling device. It will be understood that any one of a large variety of continuous samplers may be employed. In the particular embodiment shown the sampler consists of a hollow shaft 16 mounted on trunnions 17 and driven by a source of power connected to a pulley 18 and having extending radially therefrom hollow pipes 19 carrying at their ends buckets 20. It will be understood that the open face of the bucket is so disposed that when the bucket passes through the mud ditch, the mud will flow into the bucket through the hollow stem 19 into the hollow shaft 16. The hollow shaft 16 is connected by fluid-tight swivel joint to a tube 21 which discharges into the bottom of an agitating chamber 22 in which is arranged a suitable agitator 23. Connected to the tube 21 is a branch tube 24 through which solvent is introduced into the mud sample before its entry into the agitating zone.

The mixture of mud and solvent leaves the top of chamber 22 through line 25 which discharges into an intermediate point in the settling chamber 26 which may be provided internally with suitable baffles 27 to insure settling. The mud is discharged from the bottom of chamber 26 through line 28 which conducts it back to the mud ditch or to the settling pit. The solvent leaves the top of chamber 26 through line 29 which discharges into a cell 30 which is either made of transparent material or has a transparent window so arranged as to transmit to the interior of the cell light beams from a source of ultraviolet light 31 arranged outside a casing 32 in which the cell is located. Casing 32 has a suitable window 33 made of glass which passes only ultraviolet rays between the light source 31 and the cell 30. The bottom of the cell 30 is composed of a filter glass 34 which does not pass ultraviolet light.

Fixed immediately below the bottom 34 is a light cell 35 supplied with power by a battery 36 and having its output connected to an amplifier 37, the output of which is fed to a galvanometer 38 which will preferably be of the moving coil type provided with a mirror which reflects light from a light source 39 onto a moving strip 40 of sensitized paper carried by spools 41. The film may be provided with time lines, if desired, so that the record produced can be interpreted in the light of the drilling data which will indicate the depth at any given time. By using these data in connection with the known rate of circulation of the drilling mud, it is possible to calculate the depth represented by any given time line on the film. On the other hand, the winding reel for the film may be driven in a known manner by a line operating over a series of pulleys and connects to the kelly of the drilling rig, the arrangement being such that the winding reel is rotated whenever the kelly moves downwardly.

The solvent carrying dissolved oil is continuously discharged from cell 30 through line 42 which will empty into a storage vessel where the solvent may be corrected and purified for reuse. Such purification can ordinarily be conducted by passing the solvent through a decolorizing clay.

In the foregoing discussion devices have been described which electrically measure the intensity of the fluorescent light given off by the extract from the drilling mud. It will be understood that in its simplest embodiment the present invention can be practiced by visual observation of the extract. Thus, one may prepare a series of standard solutions of oil in the solvent used, these standards differing from each other by small percentages of oil in solution, subject the standards and the unknown simultaneously to ultraviolet light and match the unknown with one of the standards, whereby the approximate quantity of oil contained in the unknown is indicated.

Variations in the apparatus and procedure outlined above will occur to those skilled in the art without necessitating the exercise of inventive ingenuity. Such changes as are within the skill of the artisan are contemplated within the scope of the present claim.

Having thus described the invention, what is claimed as new and useful and is desired to be secured by Letters Patent is

In a method for logging oil wells in which drilling mud discharged from the oil well is examined for oil shows, the steps which comprise mixing said mud with a solvent for petroleum oil which does not fluoresce under ultraviolet light and is not miscible with water, separating the solvent from the mixture whereby an extract is formed, passing ultraviolet light through the extract, and measuring the intensity of the fluorescent light emitted from the extract.

JOHN J. HEIGL.